US012790807B2

(12) United States Patent
Friezner

(10) Patent No.: US 12,790,807 B2
(45) Date of Patent: Nov. 10, 2026

(54) METHOD AND APPARATUS FOR CONTROLLING HAZARDOUS MATERIALS DISPOSED WITHIN A STORM WATER CONTROL SYSTEM

(71) Applicant: Denis Friezner, Boise, ID (US)

(72) Inventor: Denis Friezner, Boise, ID (US)

( * ) Notice: Subject to any disclaimer, the term of this patent is extended or adjusted under 35 U.S.C. 154(b) by 354 days.

(21) Appl. No.: 18/657,443

(22) Filed: May 7, 2024

(65) Prior Publication Data

US 2024/0328141 A1 Oct. 3, 2024

Related U.S. Application Data

(63) Continuation-in-part of application No. 17/666,136, filed on Feb. 7, 2022, now Pat. No. 12,044,000.

(60) Provisional application No. 63/147,503, filed on Feb. 9, 2021.

(51) Int. Cl.
*E03F 5/14* (2006.01)
*B01D 35/02* (2006.01)
*E03F 5/04* (2006.01)

(52) U.S. Cl.
CPC ................ *E03F 5/14* (2013.01); *B01D 35/02* (2013.01); *E03F 5/0405* (2013.01); *B01D 2221/12* (2013.01); *E03F 2005/0416* (2013.01)

(58) Field of Classification Search
None
See application file for complete search history.

(56) References Cited

U.S. PATENT DOCUMENTS

| | | | | | |
|---|---|---|---|---|---|
| 63,284 | A * | 3/1867 | Miller | E03F 5/0404 210/163 |
| 110,366 | A * | 12/1870 | Hyde | C02F 1/281 210/660 |
| 122,209 | A * | 12/1871 | Ashman et al. | E03F 5/0404 210/163 |
| 142,671 | A * | 9/1873 | Boschen | E03F 5/046 404/4 |
| 150,072 | A * | 4/1874 | Meyer | E03F 5/046 210/533 |
| RE5,920 | E * | 6/1874 | Meyer | 210/170.03 |
| 154,645 | A * | 9/1874 | Chase | A61B 10/007 55/494 |
| 171,817 | A * | 1/1876 | Kahl | F16K 15/1441 137/847 |
| 185,017 | A * | 12/1876 | Dark | E03F 5/0404 210/163 |
| 187,181 | A * | 2/1877 | Schmitz | E03C 1/22 137/448 |
| 193,831 | A * | 8/1877 | Schmitz | F16K 15/03 137/527.6 |
| 194,329 | A * | 8/1877 | Buhrer | F16K 15/147 137/846 |
| 195,137 | A * | 9/1877 | La Baw | F16K 15/03 137/527.6 |
| 199,696 | A * | 1/1878 | Dikeman | E03F 7/04 137/448 |
| 200,573 | A * | 2/1878 | Sargent | F16K 17/12 137/454.2 |

(Continued)

*Primary Examiner* — Robert J Popovics
(74) *Attorney, Agent, or Firm* — Lance M. Pritikin

(57) ABSTRACT

An apparatus for preventing the escape of hazardous materials from fluid flow control systems of the character used by municipalities for carrying runoff storm water away from streets and populated areas.

2 Claims, 8 Drawing Sheets

(56) References Cited

U.S. PATENT DOCUMENTS 208,809 A * 10/1878 Gorman .................. E03F 5/046 404/4
227,614 A * 5/1880 Cowden .................. E03F 5/042 137/247.19
233,104 A * 10/1880 Langshmidt .............. E03C 1/00 137/248
276,217 A * 4/1883 Blatchly ................. F16K 13/10 137/251.1
295,823 A * 3/1884 Sievering ................ E03F 5/046 404/4
297,643 A * 4/1884 Stark ..................... F16K 27/006 251/95
298,045 A * 5/1884 Watkins .................... E03C 1/00 251/262
308,307 A * 11/1884 Deegan ................... E03C 1/242 4/669
324,492 A * 8/1885 Schwab ................... A47K 1/14 4/295
335,967 A * 2/1886 Shehan ................... F16K 17/12 137/532
343,326 A * 6/1886 Lowrie ................... E03C 1/284 137/247.21
355,722 A * 1/1887 Schwab ................. B65D 39/12 4/295
391,339 A * 10/1888 Runyan ................... E03F 5/046 404/4
RE10,980 E * 1/1889 Locke ............................... 404/3
416,830 A * 12/1889 Dark ......................... E03F 5/04 137/247.11
459,440 A * 9/1891 Coleman ............ B01D 17/0208 210/533
472,567 A * 4/1892 White .................... B01D 35/04 210/418
505,130 A * 9/1893 Ryan ..................... E03F 5/0404 285/391
552,010 A * 12/1895 Slavin ..................... E03C 1/296 137/247.25
576,790 A * 2/1897 O'Brien .................. E03F 5/042 137/433
601,794 A * 4/1898 Hershberger ........... E02B 13/00 210/170.03
611,074 A * 9/1898 Mowe ..................... E03F 5/042 137/527.8
623,108 A * 4/1899 Rogers et al. ........ E03F 5/0404 210/164
623,478 A * 4/1899 Keene ................... F16K 15/033 137/527
642,530 A * 1/1900 Robertson ............... E03F 5/046 210/307
705,697 A * 7/1902 O'Brien .................. E03F 5/046 210/117
712,194 A * 10/1902 Kelly ...................... E03F 5/042 137/247.19
735,007 A * 7/1903 Watson ................... F16K 27/12 137/526
784,271 A * 3/1905 Mcdonald ............... E03F 5/046 404/4
791,381 A * 5/1905 Thompson ............. B01D 21/02 210/164
802,647 A * 10/1905 Koch ........................ E03F 7/04 4/219
821,675 A * 5/1906 Shaw ........................ E03F 5/02 52/184
891,012 A * 6/1908 Shephard .............. A01M 23/08 137/527.6
929,514 A * 7/1909 Tenold ................. B01D 35/147 137/527.6
961,834 A * 6/1910 Barlett ...................... E03F 7/06 210/446
1,000,719 A * 8/1911 Cram ................... B01D 35/153 137/527
1,005,371 A * 10/1911 Union ................ B01D 17/0208 210/533
1,066,316 A * 7/1913 Piper ......................... E03C 1/22 404/5
1,220,123 A * 3/1917 Heybach .............. B01D 35/153 210/136
1,327,278 A * 1/1920 Holman .................... E03F 7/06 210/460
1,354,879 A * 10/1920 Boland ................... F16K 15/03 137/448
1,397,471 A * 11/1921 Walker ...................... E03F 7/06 43/61
1,593,083 A * 7/1926 Kirchhan ................ E03F 5/042 137/247.27
1,654,803 A * 1/1928 Griffith ................... E03F 5/046 210/242.1
1,659,364 A * 2/1928 Kelley .................... E03F 5/046 404/4
1,693,977 A * 12/1928 Egan ....................... E03F 5/046 210/163
1,793,599 A * 2/1931 Egan ....................... E03F 5/046 210/170.03
1,897,572 A * 2/1933 Cornell, Jr. ............. F16K 15/02 137/550
1,978,507 A * 10/1934 Rand ....................... E03C 1/106 4/209 FF
2,102,310 A * 12/1937 Egan ..................... E03F 5/0404 210/247
2,263,259 A * 11/1941 Boosey ................... E03C 1/282 137/247.35
2,292,003 A * 8/1942 Yant ...................... F16K 15/148 623/2.12
2,371,449 A * 3/1945 Langdon ................. E03C 1/104 137/526
2,440,857 A * 5/1948 Hart ........................ E03F 5/046 405/36
2,598,002 A * 5/1952 Langdon ............... F16K 15/147 137/846
2,615,526 A * 10/1952 Lane ..................... E03F 5/0404 188/153 R
2,629,393 A * 2/1953 Langdon ................. E03C 1/104 137/844
2,709,402 A * 5/1955 Malm ....................... E06B 7/02 52/302.1
2,796,988 A * 6/1957 Loffler .................... E03F 5/042 210/135
2,800,139 A * 7/1957 Langdon ............... F16K 15/035 137/216.2
2,912,999 A * 11/1959 Kersh ................... F16K 15/148 623/2.12
3,047,013 A * 7/1962 Baumbach .............. E03D 11/00 137/849
3,118,468 A * 1/1964 Bochan ................. F16K 15/147 137/846
3,118,469 A * 1/1964 Schliesser ............. A01M 29/30 137/527.8
3,144,876 A * 8/1964 Frye ........................ F16K 15/03 417/559
3,190,057 A * 6/1965 Sinex ...................... E21B 43/35 55/501
3,312,237 A * 4/1967 Mon ..................... F16K 15/148 137/512.15
3,372,807 A * 3/1968 Barnard ................... F01P 11/06 210/310
3,467,271 A * 9/1969 Fluke .................... F16L 55/132 138/89
3,707,986 A * 1/1973 Breen ................. F16K 15/1471 137/849
3,714,733 A * 2/1973 Madonna .............. A01M 29/34 43/131
3,815,629 A * 6/1974 Oberholtzer ............ F16K 15/03 137/527.8
3,838,706 A * 10/1974 Klenk ................... E03F 5/0407 137/433
3,941,151 A * 3/1976 Biddle .................... F16K 24/06 137/527.6

(56) References Cited

U.S. PATENT DOCUMENTS

| | | | | | |
|---|---|---|---|---|---|
| 3,955,596 | A * | 5/1976 | Diaz | F16K 15/03 | 137/550 |
| 4,009,366 | A * | 2/1977 | Danell | F02N 19/10 | 137/856 |
| 4,039,004 | A * | 8/1977 | Luthy | F16K 15/03 | 137/527 |
| 4,098,287 | A * | 7/1978 | Baumbach | E03F 5/042 | 137/454.2 |
| 4,215,716 | A * | 8/1980 | Klenk | E03F 5/042 | 137/527.6 |
| 4,289,166 | A * | 9/1981 | Haines | F16K 15/147 | 137/846 |
| 4,321,942 | A * | 3/1982 | Duggan | E03C 1/104 | 137/107 |
| 4,396,034 | A * | 8/1983 | Cherniak | F16K 15/033 | 137/527 |
| 4,416,308 | A * | 11/1983 | Bower | B65D 31/14 | 383/57 |
| 4,494,575 | A * | 1/1985 | Gladstone | F16K 15/147 | 55/432 |
| 4,586,941 | A * | 5/1986 | Cooley | B01D 53/34 | 96/147 |
| 4,594,739 | A * | 6/1986 | Watts | E03C 1/26 | 137/844 |
| 4,601,309 | A * | 7/1986 | Chang | F16K 15/03 | 137/514 |
| 4,650,365 | A * | 3/1987 | Runnels | E02D 29/14 | 404/26 |
| 4,838,262 | A * | 6/1989 | Katz | F16K 15/1402 | 128/205.24 |
| 4,867,802 | A * | 9/1989 | Earl | F16K 24/06 | 137/526 |
| 4,870,992 | A * | 10/1989 | Irwin | E03C 1/298 | 137/846 |
| 4,919,564 | A * | 4/1990 | Neathery | E02D 29/14 | 277/648 |
| 4,935,129 | A * | 6/1990 | Wang | B01D 29/05 | 220/826 |
| 5,159,953 | A * | 11/1992 | Sato | F16K 15/03 | 137/454.2 |
| 5,277,171 | A * | 1/1994 | Lannes | F16K 15/1401 | 137/854 |
| 5,301,707 | A * | 4/1994 | Hofsteenge | F16K 15/1471 | 137/12 |
| 5,323,804 | A * | 6/1994 | Lin | E03F 5/042 | 251/212 |
| 5,330,437 | A * | 7/1994 | Durman | A61M 39/06 | 604/167.04 |
| 5,518,026 | A * | 5/1996 | Benjey | F16K 15/031 | 137/512.15 |
| 5,601,112 | A * | 2/1997 | Sekiya | F16K 15/148 | 137/854 |
| 5,662,138 | A * | 9/1997 | Wang | E03F 5/042 | 137/533.15 |
| 5,702,595 | A * | 12/1997 | Mossburg, Jr. | E03F 1/00 | 210/232 |
| 5,744,048 | A * | 4/1998 | Stetler | E03F 5/0401 | 210/232 |
| 5,833,864 | A * | 11/1998 | Miller | C04B 41/68 | 210/903 |
| 6,085,362 | A * | 7/2000 | Huber | E03D 11/16 | 4/252.4 |
| 6,237,625 | B1 * | 5/2001 | Randolph | F16K 15/038 | 137/527 |
| 6,318,397 | B1 * | 11/2001 | Huber | E03F 5/0407 | 137/856 |
| 6,319,397 | B1 * | 11/2001 | Su | E03F 5/0405 | 210/163 |
| 6,626,201 | B1 * | 9/2003 | Kim | E03F 5/042 | 137/202 |
| 6,719,004 | B2 * | 4/2004 | Huber | E03F 5/0407 | 137/850 |
| 6,735,790 | B1 * | 5/2004 | Willson | E03C 1/1225 | 4/321 |
| 6,811,708 | B2 * | 11/2004 | Shaw | E03F 1/00 | 210/162 |
| 6,827,105 | B1 * | 12/2004 | Marble | F16K 15/148 | 137/854 |
| 7,101,114 | B1 * | 9/2006 | Waters, Jr. | E03F 5/042 | 405/39 |
| 7,131,787 | B2 * | 11/2006 | McGinn | E03F 5/0404 | 405/36 |
| 7,147,000 | B1 * | 12/2006 | Chen | E03C 1/23 | 251/210 |
| 7,357,861 | B2 * | 4/2008 | Kelley | E03F 1/00 | 210/473 |
| 7,509,978 | B1 * | 3/2009 | Currid | E03C 1/122 | 137/846 |
| 7,549,820 | B1 * | 6/2009 | Happel | E03F 1/00 | 210/163 |
| 7,563,364 | B2 * | 7/2009 | Shaw | B01D 35/301 | 210/163 |
| 7,662,280 | B1 * | 2/2010 | Cooney | E02D 31/004 | 210/85 |
| 7,857,966 | B2 * | 12/2010 | Duran | C02F 1/28 | 210/170.03 |
| 7,866,334 | B2 * | 1/2011 | McIntire | E03F 5/08 | 137/433 |
| 7,879,233 | B2 * | 2/2011 | Shaw | E03F 5/0404 | 210/164 |
| 7,886,765 | B2 * | 2/2011 | Chalich | F16K 15/03 | 137/526 |
| 7,922,916 | B1 * | 4/2011 | Witt | E03F 1/00 | 210/170.03 |
| 8,002,977 | B2 * | 8/2011 | Shaw | E03F 5/0404 | 210/232 |
| 8,051,568 | B2 * | 11/2011 | Moody | E03F 5/0404 | 210/691 |
| 8,075,220 | B1 * | 12/2011 | Suljevic | E01C 11/222 | 404/2 |
| 8,201,576 | B2 * | 6/2012 | Klein | F16K 15/038 | 137/527 |
| 8,216,453 | B2 * | 7/2012 | Moody | E03F 5/0404 | 210/232 |
| 8,277,646 | B2 * | 10/2012 | Singleton | C02F 1/006 | 210/163 |
| 8,323,485 | B2 * | 12/2012 | Blundell | E03F 5/0404 | 210/170.03 |
| 8,459,298 | B1 * | 6/2013 | Valdez | E03F 7/06 | 137/315.16 |
| 8,535,523 | B2 * | 9/2013 | Friezner | F15D 1/0005 | 210/170.03 |
| 8,557,108 | B2 * | 10/2013 | Rennels | E03C 1/264 | 210/163 |
| 8,591,729 | B2 * | 11/2013 | Alqanee | E03F 5/0405 | 210/170.03 |
| 8,834,613 | B2 * | 9/2014 | Kwon | A61L 9/16 | 96/108 |
| 8,864,107 | B2 * | 10/2014 | Thomas | H02G 1/08 | 254/134.3 R |
| 8,945,375 | B2 * | 2/2015 | Friezner | F15D 1/0005 | 210/170.03 |
| 9,010,363 | B2 * | 4/2015 | Huber | E03F 5/0407 | 137/527 |
| 9,038,661 | B2 * | 5/2015 | Lin | E03F 5/0407 | 137/532 |
| 9,139,991 | B2 * | 9/2015 | Huber | E03C 1/298 | |
| 9,249,553 | B2 * | 2/2016 | Perron | B01D 46/0028 | |
| 9,385,518 | B2 * | 7/2016 | Thomas | H02G 1/08 | |
| 9,416,986 | B2 * | 8/2016 | Huber | F24F 7/02 | |
| 9,428,899 | B2 * | 8/2016 | Friezner | E03F 5/0404 | |
| 9,863,546 | B2 * | 1/2018 | Chen | F16K 15/033 | |
| 10,030,374 | B2 * | 7/2018 | McAlpine | E03F 5/08 | |
| 10,053,382 | B2 * | 8/2018 | Wilkie | C02F 1/004 | |
| 10,072,410 | B2 * | 9/2018 | Damgaard Jensen | E03F 7/04 | |
| 10,180,260 | B2 * | 1/2019 | Mantyla | F16K 24/04 | |
| 10,335,724 | B1 * | 7/2019 | Morris | B01D 39/1692 | |
| 10,407,891 | B1 * | 9/2019 | Sanguinetti | E03F 5/0404 | |

(56) References Cited

U.S. PATENT DOCUMENTS 10,415,712 B2 * 9/2019 Chen ........ F16K 15/033
10,458,106 B2 * 10/2019 Benesh ........ E03C 1/298
10,631,688 B2 * 4/2020 Peters ........ F16K 1/16
10,648,165 B1 * 5/2020 Friezner ........ E03F 5/0411
10,676,913 B2 * 6/2020 Lopez, Jr. ........ E03F 7/06
10,753,077 B2 * 8/2020 Coppola ........ C02F 1/004
10,786,765 B2 * 9/2020 DiLalla ........ B01D 29/27
10,837,177 B2 * 11/2020 Valdez ........ A01M 29/30
10,864,466 B2 * 12/2020 Morris ........ B01D 29/0095
10,989,437 B1 * 4/2021 Dolan ........ F24F 13/082
10,995,483 B1 * 5/2021 Sanguinetti ........ E03F 5/0404
10,995,484 B2 * 5/2021 Friezner ........ E03F 5/046
11,047,494 B2 * 6/2021 Chen ........ F16K 15/033
11,124,958 B1 * 9/2021 Gagliardi ........ E03F 5/0403
11,186,980 B2 * 11/2021 Yeoman ........ E03F 5/0404
11,320,057 B2 * 5/2022 Bouchard ........ A01M 29/30
11,346,094 B2 * 5/2022 Lee ........ B01D 35/1435
11,457,620 B1 * 10/2022 Broadwell, III ........ F16L 55/24
11,459,744 B2 * 10/2022 Swope ........ C02F 1/001
11,470,838 B2 * 10/2022 Sørensen ........ E03F 7/06
11,473,264 B2 * 10/2022 Isaacson ........ E02D 29/1454
11,724,224 B2 * 8/2023 Morris ........ B01D 29/03
210/500.1
11,761,190 B2 * 9/2023 Yeoman ........ E03F 5/0404
210/747.2
11,769,027 B1 * 9/2023 Lopez ........ E03F 5/041
235/375
11,877,573 B2 * 1/2024 Friezner ........ E03F 1/002
12,044,000 B2 * 7/2024 Friezner ........ B01D 35/02
2001/0023707 A1 * 9/2001 Coscarella ........ F16K 15/03
137/420
2003/0053862 A1 * 3/2003 Shaw ........ E03F 1/00
405/40
2003/0080055 A1 * 5/2003 Gross ........ B60R 15/04
210/220
2003/0173277 A1 * 9/2003 Shaw ........ E03F 5/0404
210/163
2004/0049846 A1 * 3/2004 Cornwall ........ E03F 5/042
4/679
2004/0099586 A1 * 5/2004 Imoto ........ E03F 5/08
210/85
2004/0128903 A1 * 7/2004 Wexler ........ A01M 29/34
43/122
2004/0256298 A1 * 12/2004 Curtolo ........ E03F 5/0404
210/163
2005/0092372 A1 * 5/2005 Wade ........ F16K 15/03
137/527.6
2007/0033719 A1 * 2/2007 McIntire ........ E03F 5/08
4/219
2007/0090033 A1 * 4/2007 K. Kelley ........ E03F 5/0404
210/163
2007/0138074 A1 * 6/2007 Howard ........ E03F 1/00
210/163
2007/0163940 A1 * 7/2007 Persson ........ E03F 5/101
210/304
2007/0215216 A1 * 9/2007 Farruggia ........ E03C 1/298
137/512
2007/0272308 A1 * 11/2007 Spears ........ F16K 15/03
137/527.8
2007/0295652 A1 * 12/2007 Kent ........ E03F 1/00
210/164
2008/0006568 A1 * 1/2008 Moody ........ E03F 5/0404
210/163
2008/0023408 A1 * 1/2008 Hansen ........ B01D 21/01
210/170.03
2008/0145150 A1 * 6/2008 Shaw ........ E03F 1/00
405/36
2008/0149544 A1 * 6/2008 Shaw ........ E03F 1/00
210/163
2008/0296211 A1 * 12/2008 Swan ........ E03F 5/0404
210/163
2009/0008588 A1 * 1/2009 Giehl ........ F16K 31/084
251/157
2009/0095357 A1 * 4/2009 Coscarella ........ E03B 7/077
137/218
2009/0279954 A1 * 11/2009 Griffith ........ E03F 7/06
405/125
2009/0297271 A1 * 12/2009 Hummert ........ F16K 21/20
405/51
2010/0018593 A1 * 1/2010 Farruggia ........ E03C 1/298
137/527
2010/0258490 A1 * 10/2010 Haschke ........ E03F 5/0404
210/166
2011/0000837 A1 * 1/2011 Roy ........ E03F 5/102
210/164
2011/0120923 A1 * 5/2011 Shaw ........ E03F 1/00
210/163
2011/0240536 A1 * 10/2011 Tseng ........ E03F 5/042
210/136
2011/0309314 A1 * 12/2011 Thomas ........ H02G 9/06
254/134.3 R
2012/0043266 A1 * 2/2012 Moody ........ E03F 5/0404
210/163
2012/0097617 A1 * 4/2012 Blundell ........ E03F 5/0404
210/170.03
2012/0103883 A1 * 5/2012 Friezner ........ F15D 1/0005
210/156
2012/0152378 A1 * 6/2012 Mooney ........ F16K 15/03
137/511
2012/0152388 A1 * 6/2012 Stanaland ........ F16K 15/147
137/843
2012/0192950 A1 * 8/2012 Huber ........ E03C 1/298
137/1
2012/0222996 A1 * 9/2012 Rennels ........ E03C 1/264
210/163
2012/0241028 A1 * 9/2012 Kirk ........ E03F 5/042
137/527
2012/0255631 A1 * 10/2012 Stradinger ........ F16K 15/03
137/511
2013/0056399 A1 * 3/2013 Downare ........ E03F 5/0404
210/170.03
2013/0065504 A1 * 3/2013 Alemao ........ E03F 5/08
454/275
2013/0065506 A1 * 3/2013 Alemao ........ F24F 7/02
454/367
2013/0186811 A1 * 7/2013 Kaiser ........ E03F 5/0404
210/163
2014/0041744 A1 * 2/2014 Friezner ........ E03F 5/0404
138/39
2014/0165835 A1 * 6/2014 Perron ........ E03F 5/08
96/222
2014/0373943 A1 * 12/2014 Huber ........ E03F 5/0407
137/512
2015/0053598 A1 * 2/2015 Friezner ........ E03F 5/0404
210/156
2015/0247583 A1 * 9/2015 Garnett ........ F16K 15/03
137/15.04
2015/0260310 A1 * 9/2015 Bahalul ........ F16K 37/0041
137/557
2016/0084392 A1 * 3/2016 Horton ........ F16K 15/03
137/12
2016/0102780 A1 * 4/2016 Kennedy ........ F16K 47/023
137/527
2016/0153565 A1 * 6/2016 Poddar ........ E03F 7/02
251/12
2017/0107711 A1 * 4/2017 Kim ........ E03F 5/042
2017/0136392 A1 * 5/2017 Perry ........ B01D 29/58
2017/0299073 A1 * 10/2017 Parameshwaran ........ F16K 15/03
2018/0016792 A1 * 1/2018 Valdez ........ A01M 29/30
2018/0044906 A1 * 2/2018 McAlpine ........ E03F 7/06
2018/0208482 A1 * 7/2018 Grubb ........ C02F 1/004
2018/0310772 A1 * 11/2018 Peters ........ A47J 43/28
2018/0320924 A1 * 11/2018 Bryant ........ F24F 13/082
2018/0363285 A1 * 12/2018 Robinson ........ E03F 3/046
2018/0363789 A1 * 12/2018 Nguyen ........ F16K 15/03
2019/0145654 A1 * 5/2019 Bryant ........ F16L 55/24
138/96 R
2019/0293193 A1 * 9/2019 Fink ........ F16K 15/03
2020/0123757 A1 * 4/2020 Friezner ........ E03F 5/046

(56) References Cited

U.S. PATENT DOCUMENTS

| | | | | |
|---|---|---|---|---|
| 2020/0236922 | A1* | 7/2020 | Sørensen | E03F 7/06 |
| 2020/0248825 | A1* | 8/2020 | Bouchard | A01M 29/30 |
| 2020/0256046 | A1* | 8/2020 | Friezner | G01N 1/12 |
| 2020/0370290 | A1* | 11/2020 | Yeoman | E03F 5/0404 |
| 2022/0025633 | A1* | 1/2022 | Yeoman | E03F 5/0404 |
| 2022/0167609 | A1* | 6/2022 | Friezner | E03F 5/041 |
| 2022/0251819 | A1* | 8/2022 | Friezner | B01D 39/10 |
| 2024/0328141 | A1* | 10/2024 | Friezner | E03F 1/00 |

* cited by examiner

METHOD AND APPARATUS FOR CONTROLLING HAZARDOUS MATERIALS DISPOSED WITHIN A STORM WATER CONTROL SYSTEM

CROSS-REFERENCE TO RELATED APPLICATIONS

This is a Continuation-in-Part of Non-Provisional application Ser. No. 17/666,136 filed Feb. 7, 2022, which claims the benefit of Provisional Application No. 63/147,503 filed Feb. 9, 2021.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to an apparatus for controlling the egress of hazardous materials from storm water control systems.

Description of Related Art Including Information Disclosed Under 37 CFR 1.97 and 1.98

The control of excess runoff rain water has long been a problem faced by municipalities throughout the United States. Heavy rainfall can create large volumes of runoff that must be handled effectively in order to avoid flooding, that can result in road closures and substantial property damage. Accordingly, most municipalities have installed drain systems that include curbside drains that are provided at spaced apart locations along most thoroughfares. The curbside drains typically lead to main drain pipes that carry the water to adjacent rivers, directly to the ocean, or to remote catch basins.

While the prior art drain systems have, for the most part, proven effective in carrying runoff storm water away from the streets and populated areas, the control of natural debris and hazardous man-made debris entering the drain systems and remaining therein remains a major problem. For this reason, various attempts have been made in the past to prevent unwanted debris from entering into curbside drains. A highly successful system for preventing large volumes of unwanted debris from entering into curbside drains is described in U.S. Pat. No. 9,428,899 issued to the present inventor. Another somewhat similar prior art system is described in a Matthews U.S. Pat. No. 4,689,145. This patent describes a filtration system that comprises a buffer tank in the form of a generally elongated concrete box having a water inlet at one end and a water outlet at the other end. A baffle, which is provided in the tank extends from side-to-side and from the bottom to a predetermined distance from the top near the inlet pipe end of the tank end to prevent water flow in a straight line from the inlet pipe to the outlet. Unlike Applicant's system, filters are provided in the tank and extend from side-to-side and top to bottom, so that water passing through the tank must pass through the filters. The filters are located between the baffle and the water outlet to prevent particles of greater than a predetermined size from passing through the filters to the water outlet.

Debris that resides within the tubular portion of storm water control systems can cause numerous problems, including the buildup of hazardous gases that over time escape from the system, create foul smells, and causes various types of health hazards to persons exposed to the gases. Additionally, since the storm water structures temporarily, or permanently retain runoff water that keeps the debris moist, the storm water structures become ideal insect breeding areas.

Insect abatement and particularly mosquito abatement continues to present major nationwide problems. As recently observed by the American Mosquito Control Association, some sort of organized mosquito control programs exist at the state, county or city level. These programs include permanent measures such as draining swampy mosquito breeding areas and temporary measures such as aerosol spraying by ground or aerial equipment to kill adult and larval mosquitoes.

Mosquitoes can breed in any standing water, but they are particularly drawn to standing water containing substantial amounts of organic debris. Accordingly, storm water structures that temporarily, or permanently retain runoff water and organic debris require particular attention as likely mosquito breeding areas. It is a principal objective of the present invention to develop measures for the effective abatement of insects and particularly mosquitoes in such structures.

BRIEF SUMMARY OF THE INVENTION

By way of brief summary, the present invention comprises methods and apparatus for controlling the egress of hazardous matter from storm water control systems. More particularly, the invention concerns apparatus for preventing the egress of hazardous gases from storm water control systems and for abatement of insects, including mosquitoes, that reside within the tubular portion of storm water control systems. One form of the method of the invention comprises the steps of covering the fluid outlet of the tubular drain portion of the apparatus with a barrier that will block the egress of hazardous gases therefrom, but will permit the free flow of liquid therethrough. The barrier can be constructed from various materials, but in the preferred form of the invention the barrier comprises a yieldably deformable butyl rubber. Another form of the method of the invention comprises the steps of covering both the fluid inlet and the fluid outlet of the tubular drain portion of the apparatus with a barrier that will block the egress of mosquitoes from the tubular drain portion but will permit the free flow of liquid therethrough. The barrier can be constructed from various materials, but in the preferred form of the invention the barrier comprises a yieldably deformable porous material having between 280 and 800 perforations per square inch. The porous material used to construct the barrier can comprise metal, cloth, plastic and the like.

With the forgoing in mind, it is a primary object of the invention to provide an apparatus for preventing the escape of hazardous materials from fluid flow control systems of the character used by municipalities for carrying runoff storm water away from streets and populated areas.

Another object of the invention is to provide an apparatus of the character that includes a porous barrier constructed from fabric or metal mesh that will block the egress of mosquitoes from the tubular drain portion of the fluid control system but will permit the free flow of liquid therethrough.

Another object of the invention is to provide an apparatus of the character described in the preceding paragraph in which the barrier material exhibits a porosity of between about 280 and about 800 perforations per square inch.

Another object of the invention is to provide an apparatus of the character described in which the barrier material is easy to install and in no way affects the structural integrity of the storm drain.

DETAILED DESCRIPTION OF THE INVENTION

Figure 1:
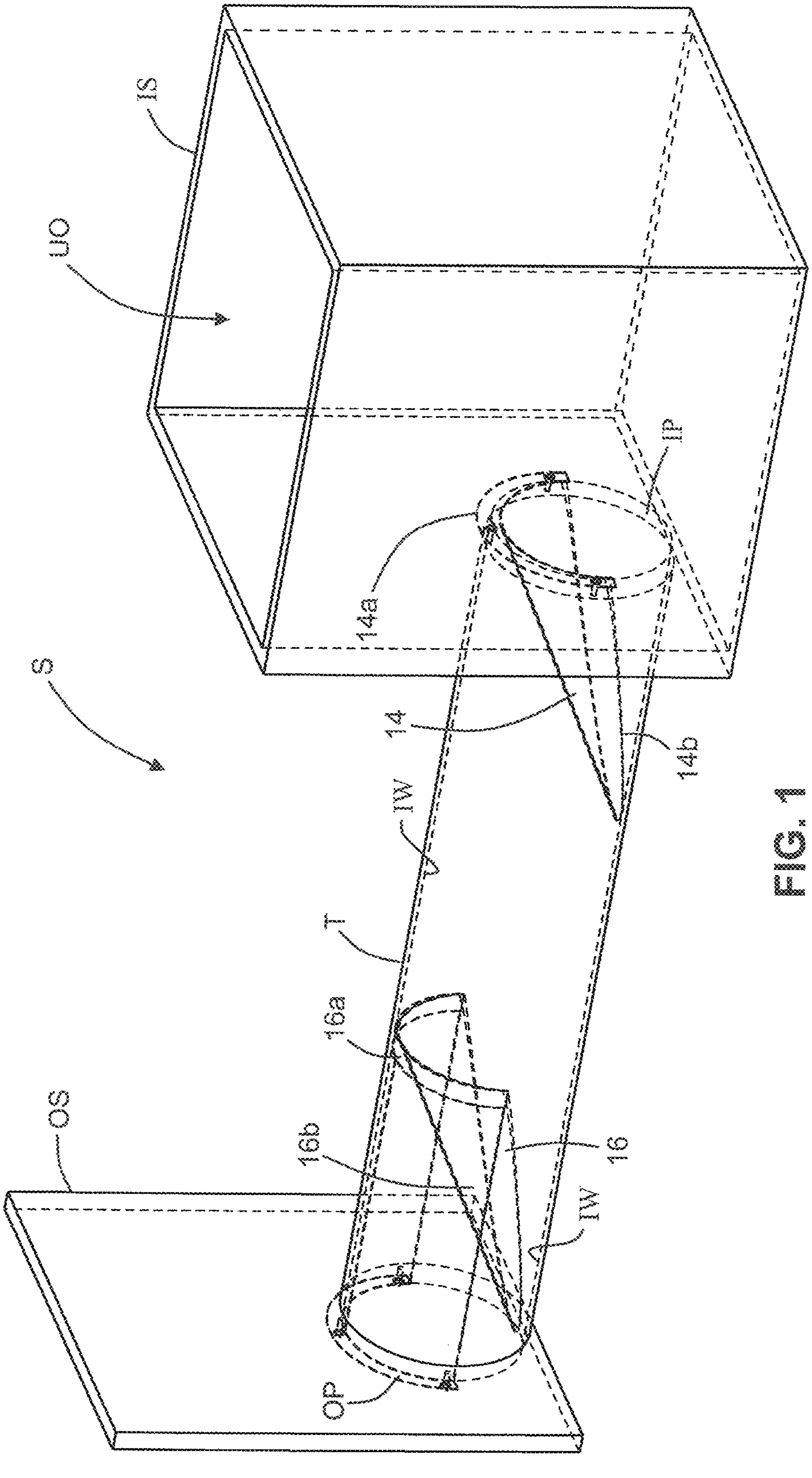
FIG. 1 is a generally perspective view of one form of the apparatus of the invention for blocking the egress of hazardous gases from the tubular portion of a conventional storm water control system showing the barrier portions thereof disposed in a closed blocking orientation.

Referring to the drawings and particularly to FIGS. 1 through 4, one form of the apparatus of the invention for blocking the egress of hazardous matter in the form of hazardous gases from the tubular portion "T" a of a conventional storm water control system "S" is there shown as it appears when positioned within the storm water control system. This embodiment of the apparatus comprises a first yieldably deformable matter blocking barrier 14 that is connected to the inlet portion "IP" of the tubular portion "T". Tubular portion "T" extends between the drain water inlet structure "IS" of the storm water control system and the drain water outlet structure "OS" of the system. Barrier 14, which can be constructed of various durable materials such as butyl rubber, includes a generally semicircular connector portion 14*a* that is connected to inlet portion "IP" and an elongate tapered portion 14*b* that extends into tubular portion "T" in the manner shown in FIGS. 1 and 3. Barrier 14 is movable between the first downwardly extending, blocking position shown in FIGS. 1 and 3 and a second upwardly extending, fluid flow position shown in FIGS. 2 and 4 of the drawings.

This first embodiment of the apparatus of the invention also comprises a second yieldably deformable barrier 16 that is connected to the inner wall "IW" of the tubular portion "T" in the manner shown in in FIGS. 1 through 4 of the drawings. Barrier 16, which is of similar construction to barrier 14 can also be constructed of various durable materials such as butyl rubber. Barrier 16 includes a semicircular connector portion 16*a* that is connected to inner wall "IW" and an elongate tapered portion 16*b* that is housed within tubular portion "T" in the manner shown in FIGS. 1 and 3. Barrier 16, like barrier 14, is movable between the first downwardly extending, blocking position shown in FIGS. 1 and 3 and a second upwardly extending, fluid flow position shown in FIGS. 2 and 4 of the drawings.

In accordance with one form of the method of the present invention, access to the inlet portion "IP" of tubular portion "T" is obtained via the upper opening "UO" of the storm water control system (FIG. 1) so that the barrier 14 can be connected to the tubular portion in the manner shown in FIGS. 1 through 4. In its at rest position, the body portion 14*b* of the barrier sealably engages the inner wall of the tubular portion in the manner shown in FIG. 1. In this position, barrier 14 effectively blocks the flow of hazardous and noxious gases outwardly of the inlet of the tubular portion and toward the opening of the inlet structure "IS".

Figure 2:
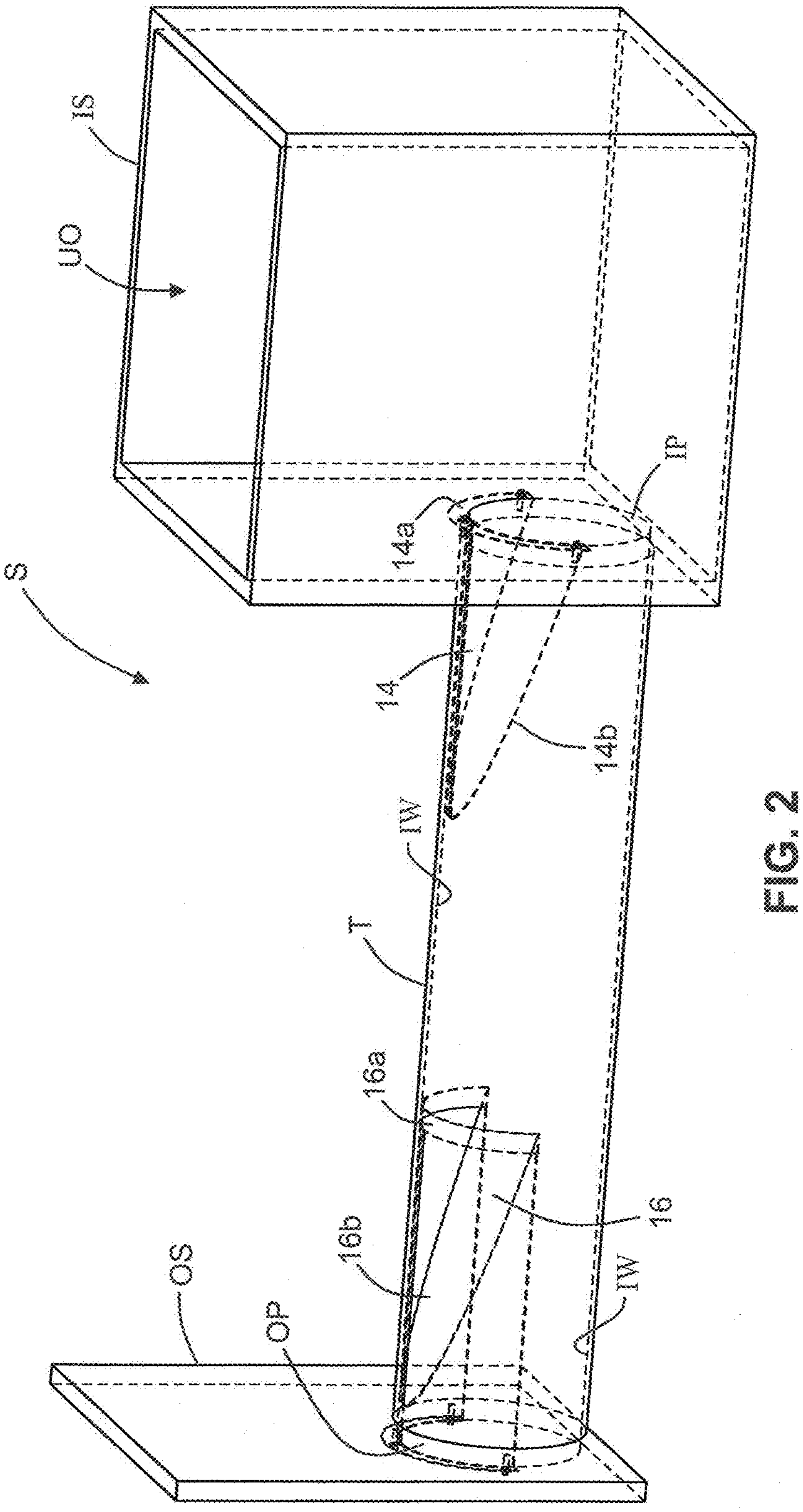
FIG. 2 is a generally perspective view similar to FIG. 1 but showing the barrier portion thereof disposed in an open orientation to permit the flow of liquids through the tubular portion.
Figure 3:
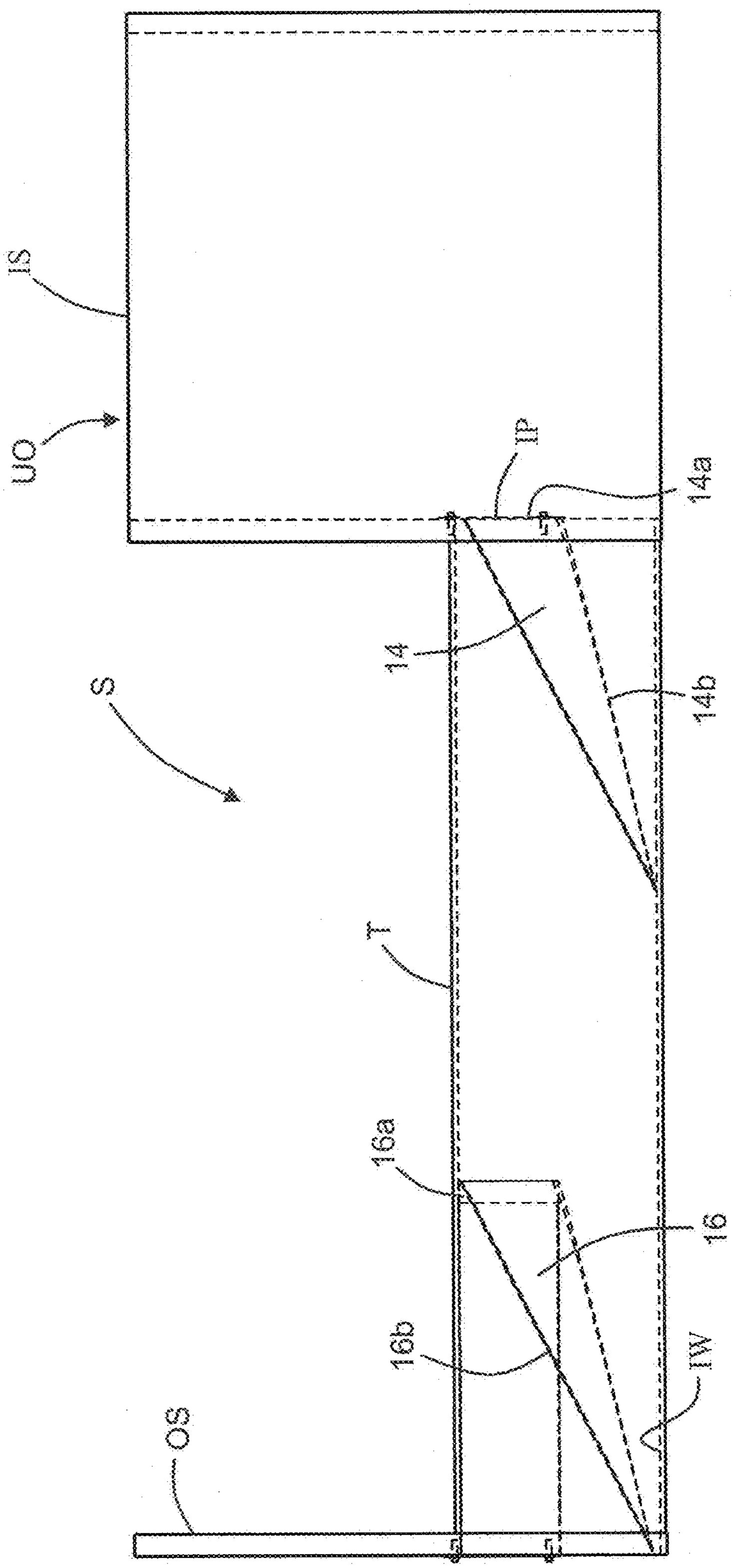
FIG. 3. is a side elevational view of one form of the apparatus of the invention for blocking the egress of hazardous gases from the tubular portion of a conventional storm water control system showing the barrier portions thereof disposed in a closed blocking orientation.
Figure 4:
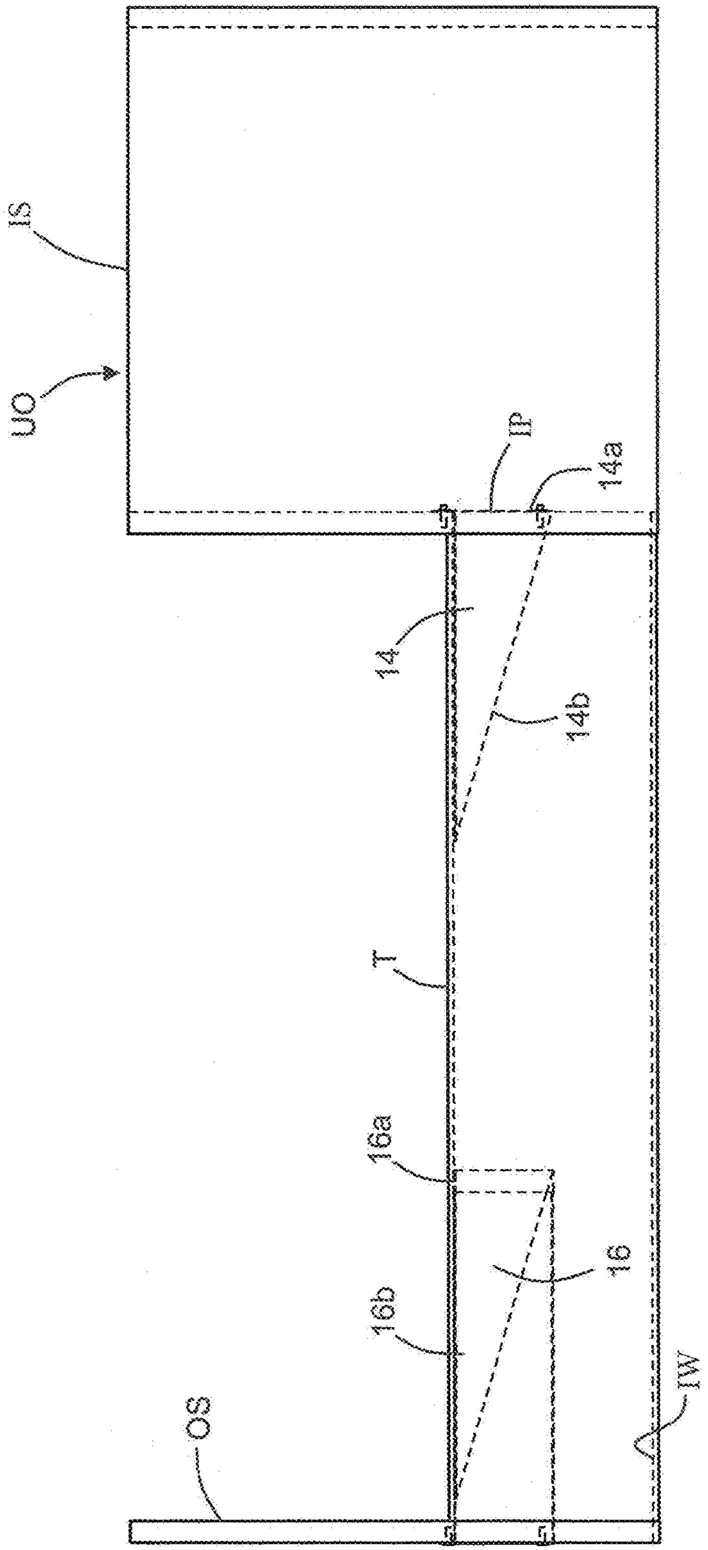
FIG. 4 is a side elevational view similar to FIG. 3 but showing the barrier portion thereof disposed in an open orientation to permit the flow of liquids through the tubular portion.

In a similar manner, barrier 16 is inserted into the outlet end of the tubular portion via outlet port "OP" in the manner shown in FIG. 1 so that it blocks the flow of gases outwardly there through. However, as illustrated in FIGS. 2 and 4 of the drawings, because of the flexibility of barriers 14 and 16, water flowing into the storm drain will cause the barriers to move into their second open position shown in FIGS. 2 and 4 allowing the fluid to flow freely through the tubular portion "T" and outwardly of the storm water control system.

Referring now to FIGS. 5 through 8 of the drawings, another form of the apparatus of the invention is there shown. This embodiment concerns an apparatus for blocking the egress of insects from the tubular portion "T" of a conventional storm water control system "S". The apparatus of this latest form of the invention comprises a first yieldably deformable porous barrier 20 that is connected to the inlet portion "IP" of the tubular portion "T". As before, tubular portion "T" extends between the drain water inlet structure "IS" of the storm water control system and the drain water outlet structure "OS" of the system. Barrier 20, which can be constructed of various porous fabric and metal, includes a semicircular connector portion 20*a* that is connected to inlet portion "IP" and an elongate tapered portion 20*b* that extends into tubular portion "T" in the manner shown in FIGS. 5 and 7. Tapered portion 20*b* of barrier 20 comprises a yieldably deformable porous material having between about 280 and 800 perforations per square inch. Barrier 20 is movable between the first downwardly extending, blocking position shown in FIGS. 5 and 7 and a second upwardly extending, fluid flow position shown in FIGS. 6 and 8 of the drawings.

This second embodiment of the apparatus of the invention also comprises a second yieldably deformable barrier 22 that is connected to the inner wall "IW" of the tubular portion "T" in the manner shown in FIGS. 5 through 8 of the drawings. Barrier 22, which is of similar construction to barrier 20 can also be constructed of various porous materials such as fabrics and metal. Barrier 22 includes a semicircular connector portion 22*a* that is connected to inner wall "IW" and an elongate tapered portion 22*b* that is housed within tubular portion "T" in the manner shown in FIGS. 5 and 7. Tapered portion 22*b* like tapered portion 20*b* comprises a yieldably deformable porous material having between about 280 and 800 perforations per square inch. Barrier 22, like barrier 14, is movable between the first downwardly extending, blocking position shown in FIGS. 5 and 7 and a second upwardly extending, fluid flow position shown in FIGS. 6 and 8 of the drawings.

In accordance with another form of the method of the present invention, access to the inlet portion "IP" of tubular portion "T" is obtained via the upper opening "UO" of the storm water control system (FIG. 5) so that the barrier 20 can be connected to the tubular portion in the manner shown in FIGS. 5 through 8. In it's at rest position, the body portion 20*b* of the barrier sealably engages the inner wall of the tubular portion in the manner shown in FIG. 5. In this position, barrier 20 effectively blocks the movement toward the inlet of the tubular portion of insects, including mosquitoes and mosquito larvae that are residing in the debris housed within the tubular portion.

Figure 5:
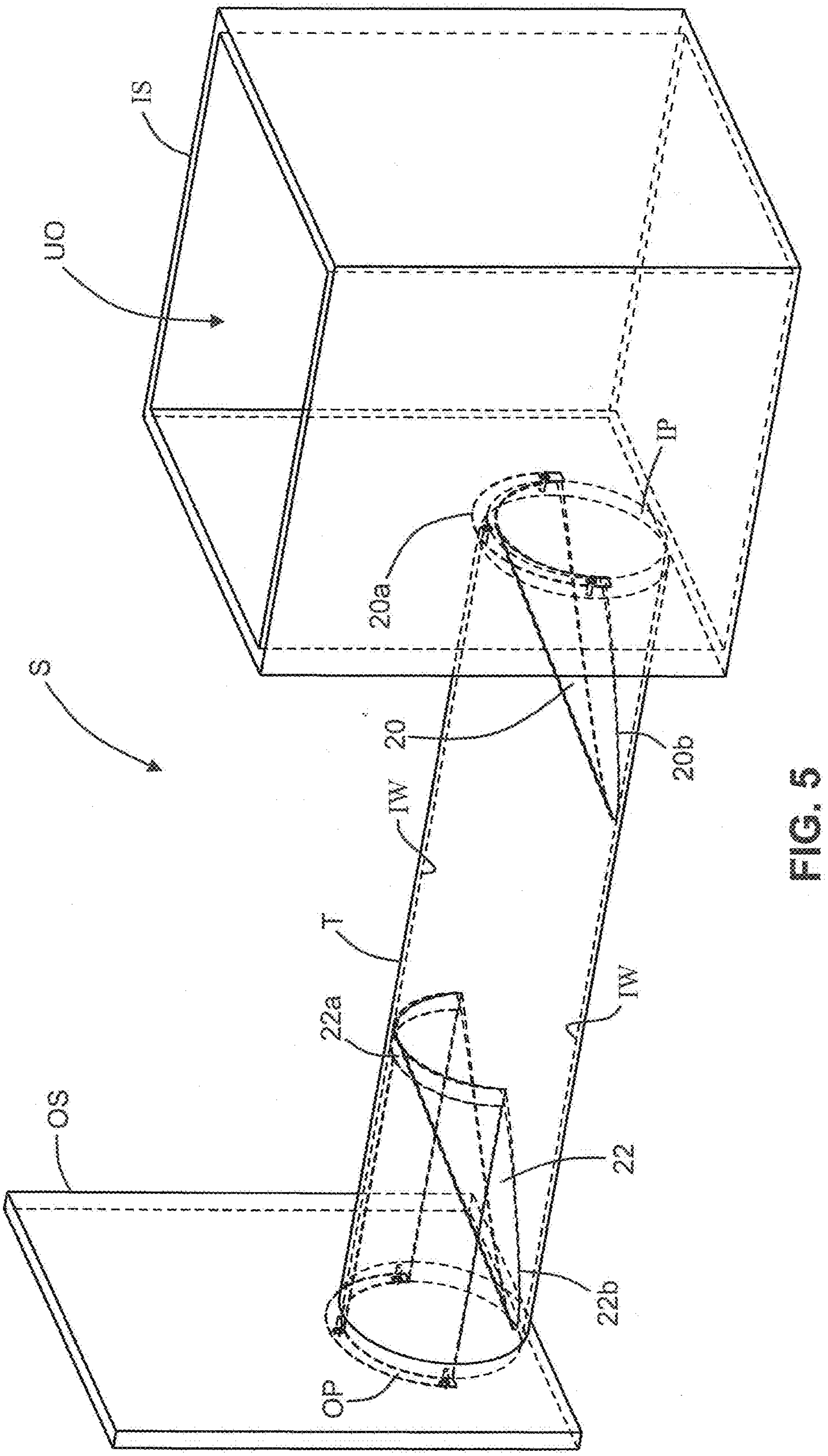
FIG. 5 is a generally perspective view of another form of the apparatus of the invention for abatement of insects, including mosquitoes, that reside within the tubular portion of storm water control systems showing the barrier portions thereof disposed in a closed blocking orientation.
Figure 6:
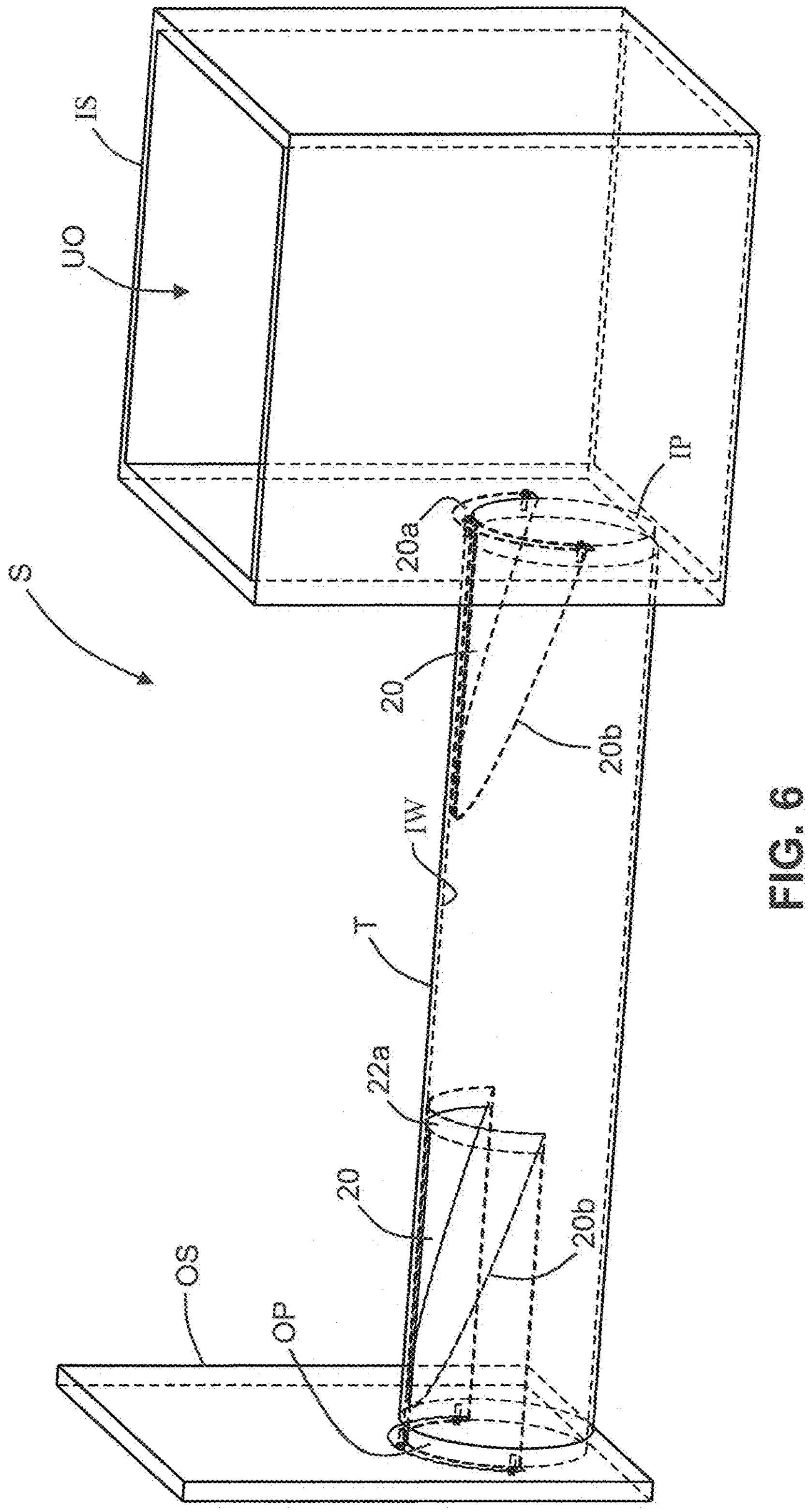
FIG. 6 is a generally perspective view similar to FIG. 5 but showing the barrier portion thereof disposed in an open orientation to permit the flow of liquids through the tubular portion.
Figure 7:
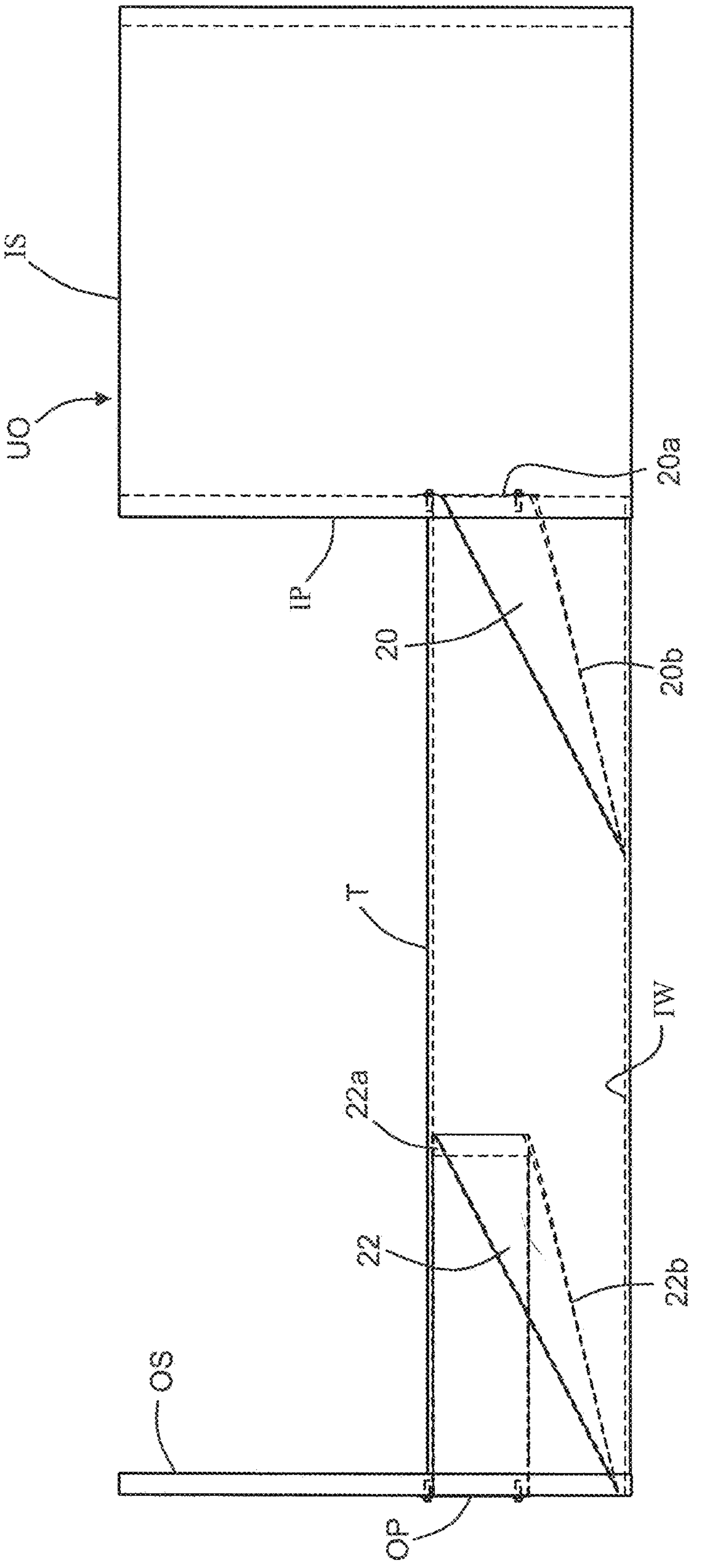
FIG. 7 is a side elevational view of another form of the apparatus of the invention for abatement of insects, including mosquitoes, that reside within the tubular portion of storm water control systems showing the barrier portions thereof disposed in a closed blocking orientation.
Figure 8:
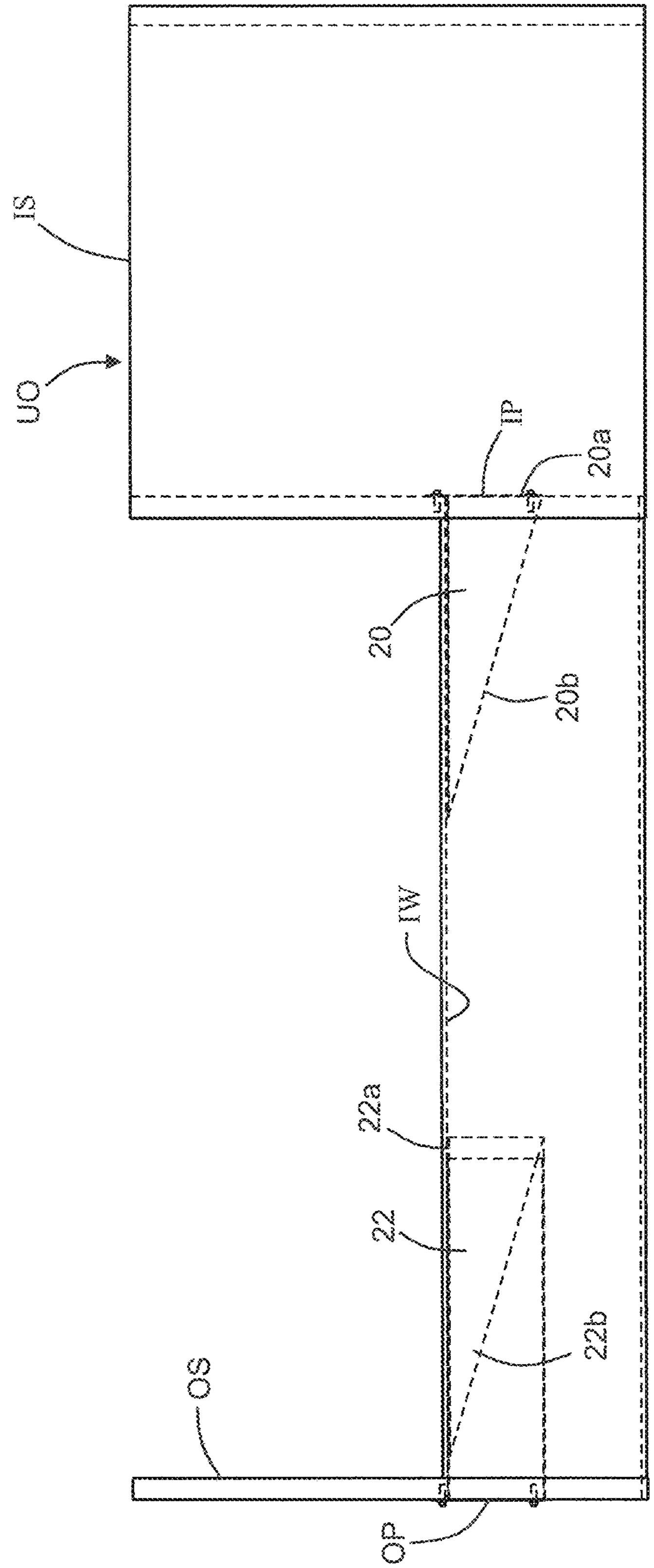
FIG. 8 is a side elevational view similar to FIG. 7, but showing the barrier portion thereof disposed in an open orientation to permit the flow of liquids through the tubular portion.

In a similar manner, barrier 22 is inserted into the outlet end of the tubular portion via outlet port "OP" in the manner shown in FIG. 5 so that it blocks the movement toward the outlet of the tubular portion of insects, including mosquitoes and mosquito larvae that are residing in the debris housed within the tubular portion. However, as illustrated in FIGS. 6 and 8 of the drawings, because of the flexibility of barriers 20 and 22, water flowing into the storm drain will cause the barriers to move into their second open position shown in FIGS. 6 and 8 allowing the fluid to flow freely through the tubular portion "T" and outwardly of the storm water control system.

It is to be understood that barriers 20 and 22 can selectively be constructed of various yieldably deformable porous materials such as fabrics and metal material having between about 280 and 800 perforations per square inch. Importantly, as shown in the drawings, both barriers 20 and 22 also include a semicircular connector portion and an elongate tapered portion.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. A method for preventing the egress of hazardous gases from a storm water control system including a storm water drain having drain water inlet structure (IS) defining a chamber in fluid communication with a fluid outlet structure (OS) having an outlet port (OP) extending therethrough, with a tubular conduit (T) interposed between the drain water inlet structure (IS) and the fluid outlet structure (OS), the method comprising the steps of:

installing a first, yieldably deformable, impermeable barrier (14) including a semicircular connector portion (14*a*) and a connected elongate tapered portion (14*b*) within the tubular conduit (T), the first barrier (14) being capable of blocking the egress of hazardous gases, by spanningly connecting the semicircular connector (16*a*) to an upper portion of the tubular conduit (T) at a point adjacent to the drain water inlet structure (IS) such that the elongate tapered portion (14*b*) sealingly contacts the tubular conduit (T) at a point further downstream relative to the drain water inlet structure (IS); and installing a second, yieldably deformable, impermeable barrier (16) including a semicircular connector portion (16*a*) and a connected elongate tapered portion (16*b*) within the tubular conduit (T), the second barrier (16) being capable of blocking the egress of hazardous gases, by spanningly connecting the semicircular connector portion (16*a*) to an upper portion of the tubular conduit (T) at a point upstream of the fluid outlet structure (OS) such that a lower portion of the elongate tapered portion (16*b*) sealingly contacts the tubular conduit (T) at a point adjacent to the outlet port (OP) of the outlet structure (OS);

wherein, storm water can flow from the drain water inlet structure (IS) through the tubular conduit (T) to the outlet port (OP), with the yieldably deformable, impermeable barriers (14, 16) temporarily deforming as needed to permit the water flow, while preventing gases from traversing the tubular conduit (T) at other times.

2. The method as defined in claim 1, wherein the yieldably deformable, impermeable barriers (14, 16) comprise butyl rubber.

* * * * *